T. P. WALSH.
LOOM FOR WEAVING KNOTTED FABRICS.
APPLICATION FILED APR. 27, 1908.

1,063,627.

Patented June 3, 1913.
8 SHEETS—SHEET 4.

WITNESSES
William J. Pike
M. J. Spalding

INVENTOR
Thomas P. Walsh
By Geo. H. Maxwell,
ATT'Y

T. P. WALSH.
LOOM FOR WEAVING KNOTTED FABRICS.
APPLICATION FILED APR. 27, 1908.

1,063,627.

Patented June 3, 1913.
8 SHEETS—SHEET 5.

WITNESSES
William J. Pike
M. J. Spalding

INVENTOR
Thomas P. Walsh
BY Geo. H. Maxwell,
ATT'Y

T. P. WALSH.
LOOM FOR WEAVING KNOTTED FABRICS.
APPLICATION FILED APR. 27, 1908.

1,063,627.

Patented June 3, 1913
8 SHEETS—SHEET 7.

WITNESSES
William J. Pike
M. J. Spalding

INVENTOR
Thomas P Walsh
BY Geo. H. Maxwell
ATT'Y

UNITED STATES PATENT OFFICE.

THOMAS P. WALSH, OF WORCESTER, MASSACHUSETTS, ASSIGNOR TO WALSH-BAKER CORPORATION, OF PORTLAND, MAINE, A CORPORATION OF MAINE.

LOOM FOR WEAVING KNOTTED FABRICS.

1,063,627.  Specification of Letters Patent.  Patented June 3, 1913.

Application filed April 27, 1908. Serial No. 429,297.

*To all whom it may concern:*

Be it known that I, THOMAS P. WALSH, a citizen of the United States, and resident of Worcester, in the county of Worcester and State of Massachusetts, have invented an Improvement in Looms for Weaving Knotted Fabrics, of which the following description, in connection with the accompanying drawings, is a specification; like letters on the drawings representing like parts.

My invention is a loom for weaving rugs or other fabrics, and provides means for accomplishing mechanically what has been accomplished before by hand in the weaving of oriental rugs, i. e., rugs, carpets, and woven products in which the filling, pile, or other weft like portions are tied, looped, or knotted immovably to the warps in the course of the continuous weaving of the fabric, and accordingly I intend herein to claim broadly means for accomplishing said results, as I believe myself to be the first to have succeeded in devising mechanical means capable of accomplishing this purpose.

My invention also includes, in its preferred embodiment, means for producing various other oriental-rug effects, such, for instance, as the irregular or apparently uncertain appearance of the pattern and the peculiar soft appearance and flexible effect. But in order that the radical departure of my invention from all previous looms may not be misapprehended and the pioneer character of the invention lost sight of, I wish it understood that, irrespective of these other, last mentioned, features of invention, although important in themselves and far reaching in their results, the basic feature of my invention consists of providing means for tying, looping, or knotting the filling threads to the warp or supporting thread in such manner that it is immovable by a lengthwise pull and cannot be pulled out or dislodged from the completed fabric. I have referred above to oriental rugs for the reason that this immovability of the filling against longitudinal pull is perhaps the most important distinguishing characteristic, from the weaver's standpoint, of these celebrated products, but, by so referring to oriental rugs, I do not intend to restrict my invention to the production of technically so-called rugs, nor to the formation of the particular kinds of knots commonly found in oriental rugs, as my invention is applicable to a much wider range of products, being in fact readily adaptable to all varieties of fabrics containing warp and weft and in which it is desirable that the two shall be immovably connected at various intersecting portions throughout the fabric.

The constructional details of my invention, the operation thereof, and the various resultant advantages will be more apparent from the following description, taken with reference to the accompanying drawings, in which I have shown one of the preferred mechanical embodiments of the invention.

In the drawings, Fig. 3ª shows similarly the upper end, which is broken off from Fig. 3.

I have already briefly characterized certain of the principal differentiating features of my invention, and before entering upon the detailed description, it may be well to point out that the invention is broadly distinguished from previous attempts to weave a knotted pile fabric, in that it knots a weft on a warp, as distinguished from knotting a warp on a weft, in the course of the manufacture of an oriental rug. As a result, I am enabled to use one and the same thread, thrown from a shuttle or any other means, to form simultaneously all the piles for a given length, preferably entirely across the fabric. I do not intend to limit the invention in any way to the means of putting the shot or pick of weft (by which term I mean to include any and all transverse pile threads) transversely of the loom, as it may be a shuttle, eye needle, nipper needle, or what not. For clearness of presentation of my invention, in its broader aspects, I have shown the simplest kind of embodiment, viz. a loom weaving fabric in which the weft is formed around all the contiguous warp threads, but I wish it understood that my invention, as hereinafter broadly claimed, is not limited in the latter respect.

My invention makes it readily feasible, not only to knot the weft on each warp or otherwise as desired, but the entire knot is made in the same pick with a continuous movement of the loom, and a variety of knots may be made with the same mechanism. A plurality of knots are tied in the uncut weft, or in other words, the weft is coiled around the warp threads at at least three or more separated places throughout the length of the intact weft thread in the breadth of the fabric, and with a coil of the weft thread around at least one of the two adjacent ground warp threads which constitute a pair, before the weft is cut.

In some respects my present application is subordinate to some of the claims of my copending application Ser. No. 425,918 in which a very different mechanism is shown for weaving oriental rugs, etc. In the present loom, the weft is knotted onto the warp and the changing of colors in the weft depends upon the box motion, and I have endeavored to embody my invention in such mechanism as to adapt it to any of the usual box motions. So that it will be understood that, although I have herein shown a simple two-by-two box motion, any other more complex motion may be employed with a corresponding increase in variety of colors or material in the filler. First, to make the general mechanism understood, I point out that the warp threads 1 pass from a warp beam 2 loosely journaled at 3 in the loom sides 4 the same as in my first mentioned application, said warp beam being preferably provided with a delicate tension adjustment, shown as a friction strap 5 fast at 6 and held yieldingly adjustable by a spring 7, nut 8 and threaded bolt 9 operated by a handle 10 having a releasing cam 11 normally in clamping position. The warp 1 passes thence over a guide roll 12 held in supports 13, and thence about a let-off drum 14 journaled at 15 in the loom sides, and under a guide roll 16 supported in forks 17. In the present construction, the warp threads 1 may be considered to all intents and purposes as endless, *i. e.*, they have no definite beginning or end, but the fabric as it is woven is rolled or gathered forward continuously, so that the loom is capable of weaving a product of indeterminate length.

As my present loom is provided with a shedding motion, the warp threads are separated into pairs, one warp thread of each pair being laid over suitable mechanism for permitting it to be depressed when the other warp thread of said pair is in a raised position, and to accomplish this I have provided independently movable easing rods 18, 19, over one of which, the rod 18, one warp thread of each pair passes, while the other warp thread of each pair passes over the rod 19. These rods are mounted to swing freely respectively on levers 20, 21, pivoted to an arm 22 mounted loosely on the shaft 15 and connected by a swiveled block 23 to a rod 24 bent at 25 so as to extend diagonally down to a point 26 where it is pivoted to a cam lever 27 fixedly pivoted at 28 on a stand or bracket 29 and operated by a cam roll 30 traveling in a path cam 31, said block being moved yieldingly by opposite springs 32, 33. The levers 20, 21, are held in yielding position by springs 34, 35, which permit the warps to yield for the shedding motion as will presently be more fully explained. Stops 36, 37, limit the movement of the levers 20, 21, in an opposite direction, thereby maintaining a desired tension on the warps. At the front of the loom any suitable take-up mechanism is provided, that herein shown consisting of a take-up roll 38 just beneath the breast beam 39, a guide roll 40, and final take-up roll 41 operated by a ratchet wheel 42, pawl 43, intermediately pivoted lever 44, actuated by a rod 45 adjustably secured at 46 to a cup crank 47 fast on the main driving shaft 48 at the rear end of the machine, as shown in my application Serial No. 415,780, filed February 13, 1908.

The knotter, in its elemental parts and general operation is also the same as in my previous application Ser. No. 415,780, but has more movements and additional mechanism. I preferably employ an arched warp carrier for each warp thread or pair of warp threads having axial movement from one end, the warp thread or threads being passed through eyes in said carrier in such a manner that when the warp carrier is revolved on its end-pivot they are bent back on themselves in such a manner as to form an open loop in each warp thread, through which is then passed the weft thread or pile-forming strand, whereupon the warp carrier is turned back again, thereby transforming its warp thread loops into coils about the thus inserted weft strand, and subsequently the warp and weft threads which have been thus intercoiled have their relative coiled relation changed in such a manner that the warp threads become substantially straight and the coil formation is assumed by the weft strand in the form of coils thereof about said warp threads, as will now be explained. Fast on stub shafts 49 are crank arms 50 adjacent whose free ends are freely pivoted rods 51, 52, and fixed at uniform intervals on these rods are two sets of warp carriers 53, 54, each arch shaped in form and provided with thread eyes suitably arranged to receive the warps so as to coöperate in producing the desired loops therein when operating, all substantially the same as set forth and claimed in my last mentioned application, eyes 55, 56, being herein shown. For convenience, and in order to permit the rods 51 and 52 to be separated a short distance, the two sets of warp carriers have their forward ends (when viewed as shown in Fig. 1) bent differently, the carriers 54 being bent backward so as to be secured to the rod 52 and the carriers 53 coming down approximately straight to the rod 51.

Figures 1, 7, 8:
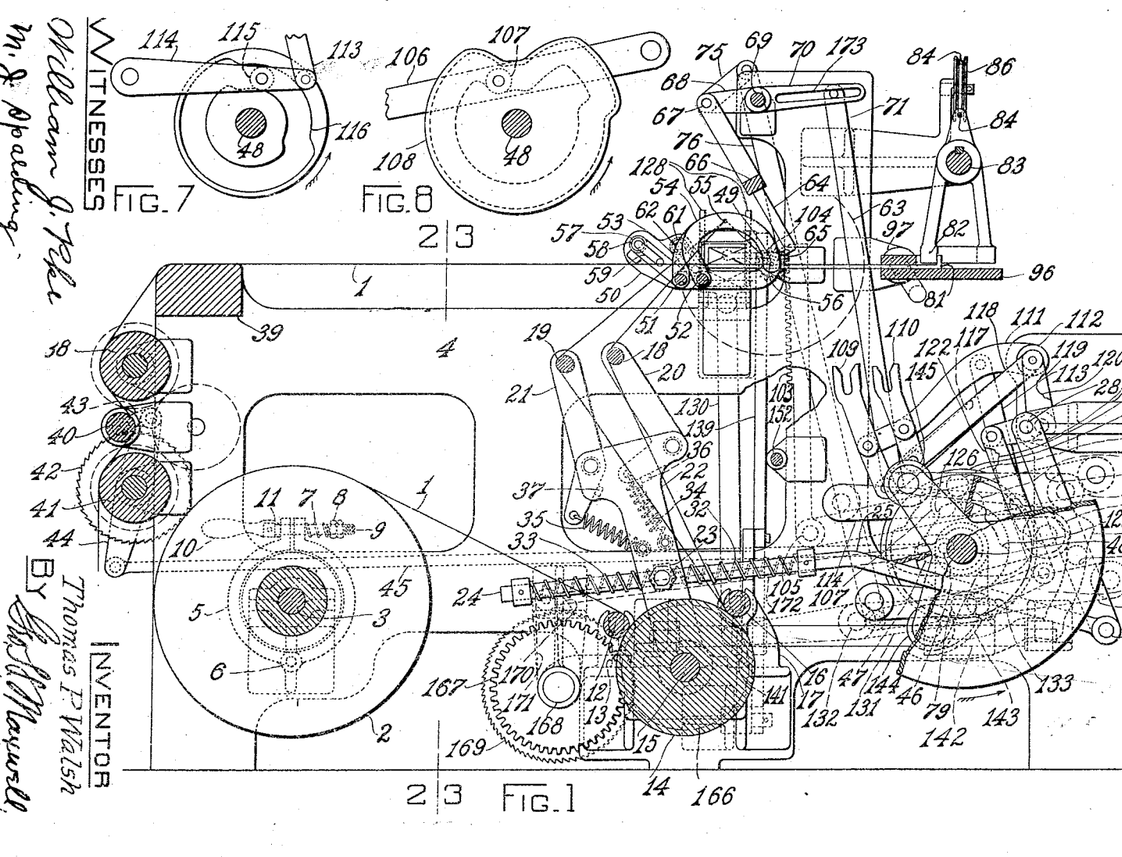
Figure 1 shows the loom in central vertical longitudinal section.
Fig. 7 shows the cam for lifting the shedding arms.
Fig. 8 shows the cam for operating the knotter.
Figure 2:
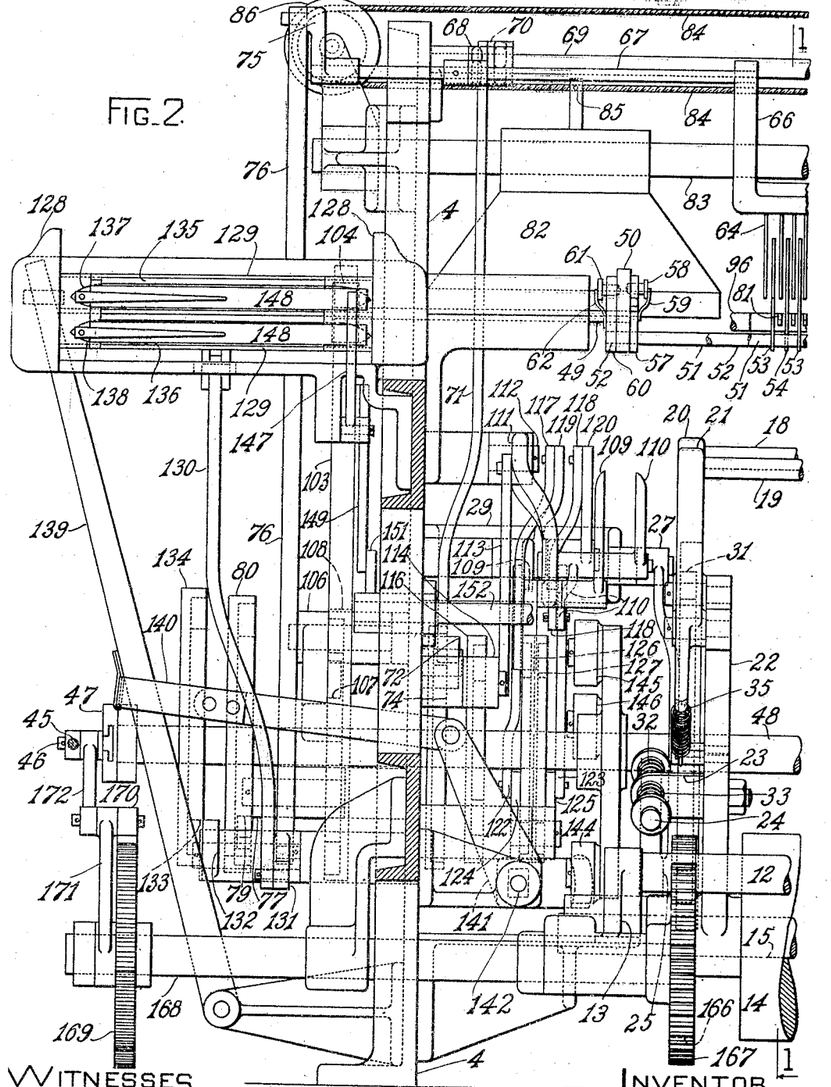
Fig. 2 is a transverse vertical sectional view enlarged, showing the left hand side of the loom.
Figures 4, 9:
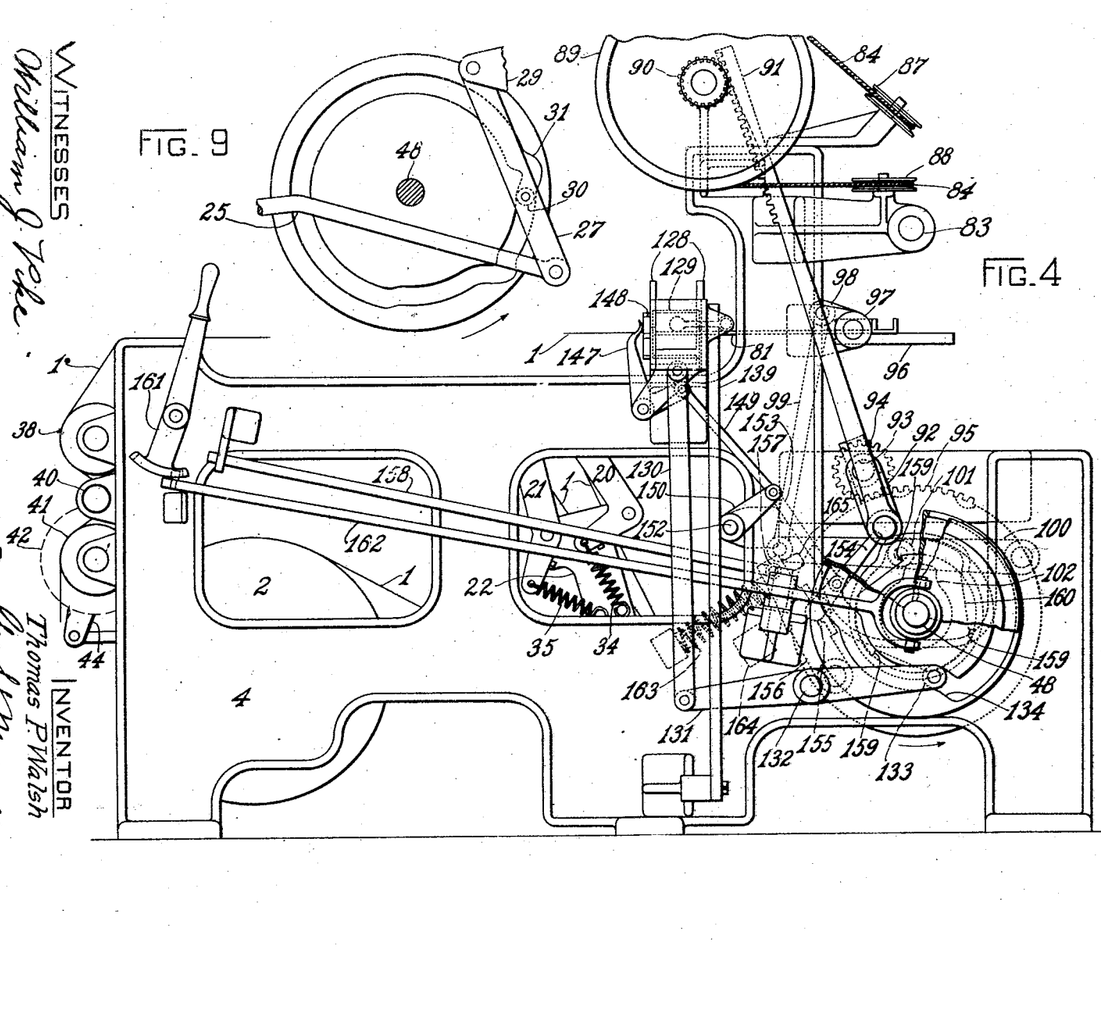
Fig. 4 is a right hand side elevation of the loom.
Fig. 9 shows the cam for easing the warp threads.
Figures 5, 6, 10:
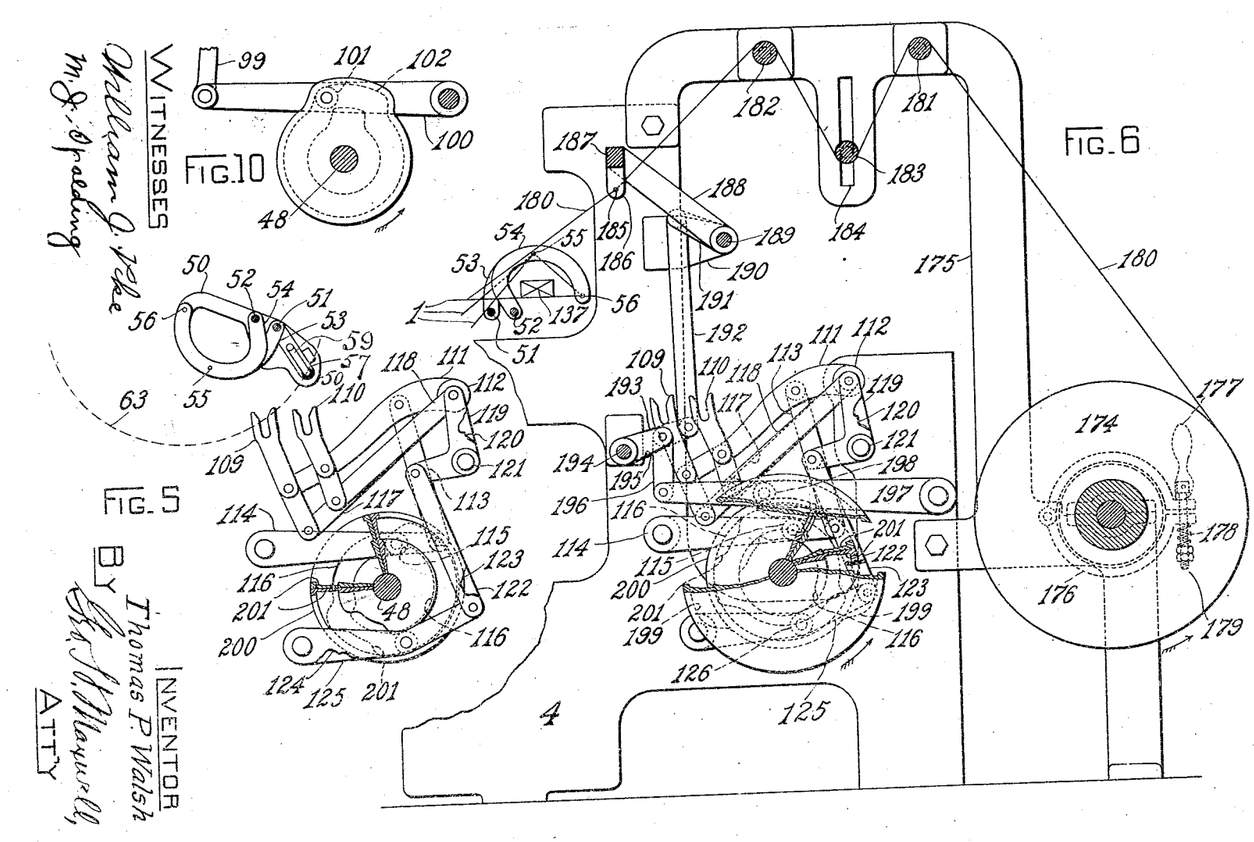
Fig. 5 is a sectional detail showing in side elevation the shedding mechanism just ready to operate.
Fig. 6 is a longitudinal sectional view of the extreme rear end of the loom, provided with the mechanism for weaving with the Persian knot.
Fig. 10 shows the cam for raising and lowering the filling slackening fingers.

Fast on the rod 51 adjacent the crank arm 50 is a lever or finger 57 for turning said rod 51, and consequently its warp carriers 53 at the desired shedding moment, said finger being normally held locked against the crank arm 50 by a locking pin 58 normally held in locking position by a spring 59, as best shown in Fig. 2,—see also Fig. 1 and Fig. 5. The shaft 52 projects through the arm 50 where its end is provided on the side opposite the finger 57 with a similar finger 60 fast thereon to turn said shaft 52, being normally held locked against the arm 50 by a locking pin 61 held by a spring 62. The path of movement of the warp carriers is the same as in my first mentioned application, and is indicated by the line 63. The warp carriers are shown in Fig. 1 in the position to receive the shuttle carrying the filling pile. From this position they swing downwardly and up over to permit the knot thus formed in the filling pile to be beaten up and the pile formed therein. As herein shown, I acomplish both the beating up and the pile-forming by one and the same device. The reed or comb 64 has its fingers provided with hooks 65 at their lower front ends and the reed frame 66 is pivoted at 67 on the forward end of a lever 68 whose shaft 69 is rocked by an arm 70 actuated by a link 71 connected to a cam lever 72 whose roll 73 travels in a path cam 74. This at the proper moment causes the desired lifting move ment of the comb, which pulls up and forms the pile. At the same moment the comb is swung forward for the beating-up operation by means of an arm 75 rigid with the comb frame and connected by a link 76 to a cam lever 77 at 78 actuated by a cam roll 79 traveling in a path cam 80. As the pile thread is shot through the knotters, or warp carriers, the slack-forming needles 81, one between each pair of warp carriers and which have been in forward position to constitute a bottom guide for guiding the shuttle, are pulled back just after the shuttle has passed, thereby drawing extra thread from the shuttle to produce sufficient slack for the desired length of pile. They are pulled back by a cam 82 reciprocated on the shaft 83 by a cord 84 to which it is fastened at 85, passing over guide wheels 86, 87, 88, see Figs. 1, 2, and 4, driven by a drum 89 provided with a pinion 90 operated by a rack 91 and crank 92 extending from a shaft 93 driven by a pinion 94 in mesh with a mutilated gear 95 fast on the main driving shaft, all as shown and claimed in my first mentioned application, the latter and its pinion being so proportioned and constructed as to give the requisite dwell at the end of the slack-producing motion to permit the knotting movements to take place before the return movement of the slack-producing cam 82. The needles 81 are mounted to slide in a plate 96 extending between opposite hubs 97, one of which has a crank 98 connected by a link 99 actuated by a cam lever 100 whose roll 101 travels in a path cam 102 so timed that it drops the needles out of the way of the knotters as soon as the filling shuttle has completed its shot and reached its box, at which time the cam 82 has reached the end of its stroke and is therefore out of the way. Preferably the timing of the slack-forming mechanism is such as to permit this movement to be as slow as possible without interfering with the time required for executing the various other movements. The needle-like fingers 81 are employed as a convenient means for preventing the weft thread from remaining taut, lest, when subsequently the oriental knots are tied, there would remain no surplus filling or weft thread to constitute the pile loops and hence (after cutting) the piles, and accordingly these lateral pulling devices or needle-like fingers are provided at a plurality of places throughout the length of the weft thread across the loom and operated to pull it transversely so as to provide said necessary slack. These fingers or needles are also used, when in their initial horizontal position, as a convenient supporting track or raceway for the passage of the shuttle. This is not essential, but, in view of the fact that the warp threads are led around in loops, or in other words each warp is looped over and held open while the weft is passed through it, it is desirable that the shuttle should have a stronger support than merely that of the warp threads. As soon as the shuttle has shot under the arch of the warp carriers, and hence through the warp loops just mentioned, formed in the body of the warp threads by the position of the warp carriers at the moment, said warp carriers are reversed in position, and thereby the deposited shuttle thread is embraced or surrounded by a coil of each warp thread which is carried around the same by the reverse rotation of the warp carriers, as presently explained. It will be understood that, while I have shown the various cams as timed to coöperate with each other for ordinary running speed, I do not intend to restrict the invention to the particular timing herein shown, as the various cams may be changed to some extent to give more time to particular movements.

Figures 3, 3A:
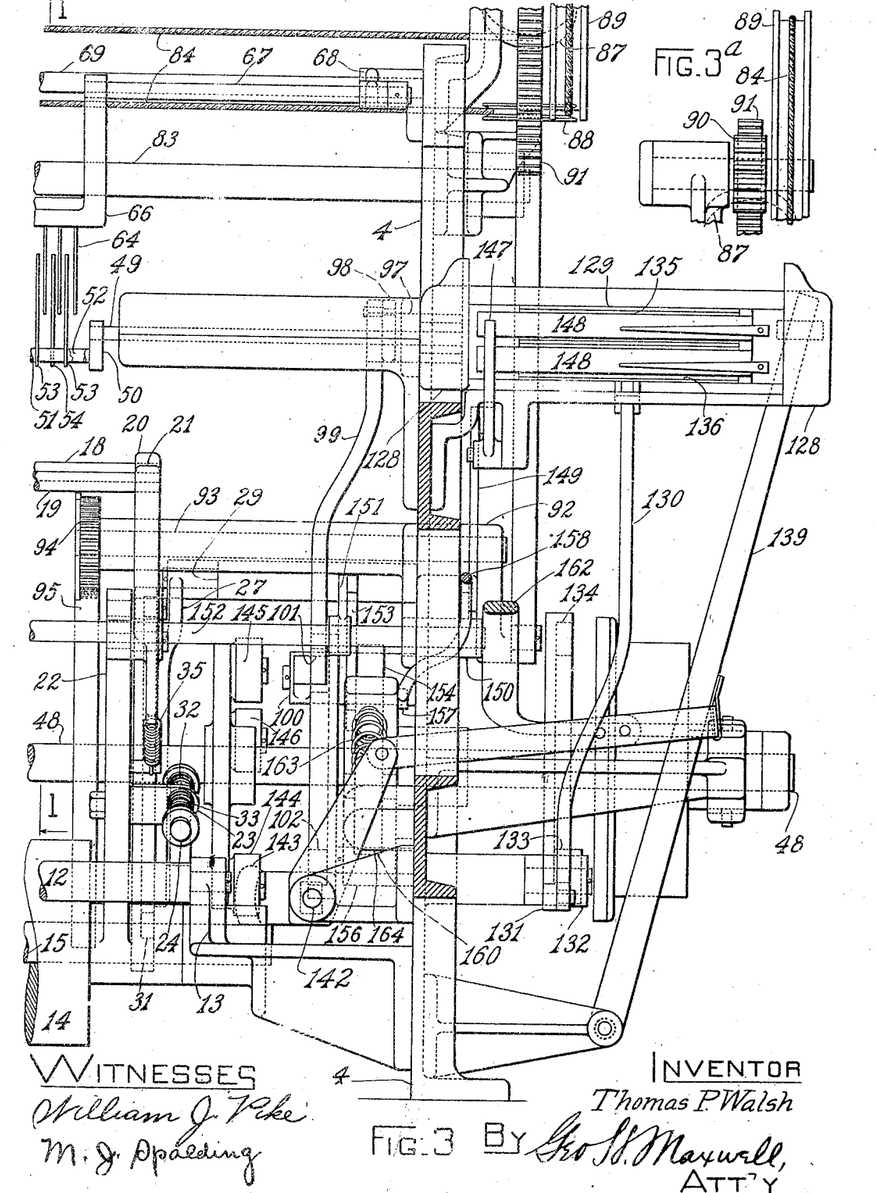
Fig. 3 is a view similar to Fig. 2, showing the right hand side of the loom.

As the slack-forming needles 81 drop by the rotating of their hubs 97, the knotter ties its knots. To accomplish this movement the warp carriers are rotated as stated in the path 63 by the engagement of a rack bar 103 with a pinion 104 fast on the end of one of the stub shafts, see Fig. 2, said rack bar being pivotally connected at 105 with a cam lever 106 whose cam roll 107 travels in a path cam 108. When the upward swinging movement has been completed thereby forming all the knots, the beating up and pile forming operation takes place by the combined forward swinging and upward pulling movement of the comb 64 and then the warp carriers swing back slightly below horizontal position, in which position they stop for the shedding movement. The filling is knotted onto the warp-threads as follows: As soon as the shuttle has shot the filling through the loops of warp-threads (which are held in arch or loop formation by the carriers 53, 54, Fig. 1, as already explained) the warp carriers are reversed or swung under and upward along the path indicated by the dotted line 63, Fig. 1, thereby carrying one end or terminal of each loop around under the shuttle thread or filling thread and forming thereby a coil in each warp thread about said filling thread, but as the warps are comparatively taut and the filling thread is slack, the warps immediately straighten out, thereby compelling the filling thread to assume the coiled shape, virtually transferring the coil or loop of each warp thread to the adjacent portion of the filling thread. The result is that the filling thread is thereby coiled or looped around the successive pairs of warps, with the pile ends (they become pile ends when subsequently cut) of the filling thread projecting upward from between each of said pairs of warps. The shedding movement may be accomplished by any suitable mechanism which will operate to lift the two sets of warp threads dissimultaneously, with a dwell between said lifting movements sufficient to permit the passage of the binder weft, and as herein shown I accomplish this movement by moving the warp carriers, lifters 109, 110 being provided, pivotally carried by an arm 111 pivoted at 112 on the frame and lifted at the right moment by a link 113 connected to the free end of a cam lever 114 whose roll 115 travels in a path cam 116. As the lifters 109, 110 are raised their beveled ends, see Fig. 2, engage behind the headed ends of the locking pins 58, 61, thereby unlocking the fingers 57, 60 from the crank arm 50 and then one or the other of the members 109, 110, as the case may be, is quickly swung forward by the action of links 117, 118 pivoted respectively to the lower ends of said members 109, 110 at one end and at their other ends to bell cranks 119, 120 both pivoted at 121 and connected by links 122, 123 to cam levers 124, 125 whose rolls travel in path cams 126, 127. This movement sheds the warp threads forward of the knotter which at that moment, instead of being in the position shown in Fig. 1 is swung to the rear entirely out of line with the shuttles. Just before the shed opens, the box motion raises the binder shuttle into position to shoot the binder thread across and back again, the present loom being arranged to provide two picks of binder to one pick of pile. The box motion is best shown in Figs. 2, 3, and 4. On usual guides 128 a shuttle box 129 is mounted to be reciprocated by a link 130 actuated by a cam lever 131 pivoted at 132 and having its cam roll 133 traveling in a path cam 134. The shuttle box is herein shown as having two cells 135, 136 to be occupied by shuttles 137, 138, the former for pile thread and the latter for binder thread. A usual picker stick 139 is actuated by a picker-stick connector 140 and sweep arm 141 on the picking shaft 142 and shoe 143, which in turn is actuated at the proper times by picking balls 144, 145, 146 carried by a plate or arms radiating from the shaft 48, the first mentioned picking ball 144 actuating the pile shuttle and the other two the binder shuttle and so positioned relatively to each other as properly to lay a pick of pile thread alternating with two picks of binder thread. To prevent a shuttle smash, any usual form of protection is provided, a protecting finger 147 being shown engaging the shuttle binders 148 and actuated by a link 149 and cranks 150, 151 from a shaft 152, the crank 151 connected by a link 153 with a protection dagger 154 pivoted at 155 in an arm 156 whose free end is pivotally connected at 157 to a pusher 158 in position to be moved forward by the engagement of the free end of the dagger 154 with one of the three notches 159 of a plate 160 fast on the main shaft 48, said forward movement taking place whenever the shuttle fails to reach the box on any given pick, and serving to actuate the shipper lever 161 so as to actuate the shipper fork 162, all in usual and well known manner. A spring shock absorber 163 takes the shock of the dagger action and a stop 164 is provided for limiting the backward movement of the dagger arm 156 and a stop 165 correspondingly limiting the forward movement. The let-off roll 14 is provided with a gear 166 fast on its shaft 15, driven by a gear 167 on a shaft 168 at whose outer end is a ratchet wheel 169 engaged by a pawl 170 on an arm 171 connected by a connecting rod 172 to the cup crank 47.

In use, the warp threads are laid in a practically endless path from the warp beam 2 around through the weaving mechanism and back to the take-up rolls, passing over the let-off roll 14 and thence in two sets, each composed of alternate threads, over the easing rods 18 and 19 to corresponding sets of warp carriers 53, 54, the alternate warp carriers 53 receiving all the warp threads which pass over the rod 19 and the alternate warp carriers 54 receiving all the warp threads which pass over the rod 18. This arrangement may be reversed, being a mere matter of threading the warp carriers. The warp threads having been placed in their proper position in the warp carriers (their position determining, as fully explained in my first mentioned application, whether a so called Turkish knot or a so called Indian knot is to be tied), the warp carriers are first swung around from the position shown in Fig. 1 to the limit of their upward swing and then back again just below the horizontal, whereupon the shedding forks or lifters 109, 110 are brought into play by their actuating cams 126 and 127, each of which motions produces a shedding movement. After each shedding movement the operator passes binder thread by hand across from one side of the loom to the other in usual manner until the desired usual border or holding piece has been woven before the body of the rug is begun. Thereupon the loom is started, the first movement operating to swing the knotter mechanism back to normal position as shown in Fig. 1, whereupon the shuttle box 129 is dropped by its cam 134 and rod 130 so as to bring the top or filling shuttle into line with the opening or arch of the warp carriers and thereupon the adjacent picker stick is operated by picking ball 144 to drive the shuttle 137 through the warp loops formed by the arch of the warp carriers. As the shuttle proceeds, the slack-forming needles 81 begin drawing back slack so that by the time the shuttle has reached the opposite side of the loom quite a number of said needles have already completed their operation, as much time being preferably given for this movement as possible. When the slack-forming needles have taken up all the pile filling required for the subsequent forming of the piles, the needles 81 drop out of the way, their actuating cam 82 having by that time passed to the end of its movement beyond the plate 96. Meanwhile the knotter begins its knot-forming movement, being swung from its position Fig. 1 around in the path 63 by the upward movement of the rack 103 in engagement with the pinion 104 of the knotter, and as it reaches its uppermost position, thereby having coiled a filling thread around each warp thread at each warp carrier, it dwells momentarily to permit the beating-up comb to swing forward carrying each coil or loop of pile thread off from the knotter and shifting it along the then taut warp threads until finally beaten up. Simultaneously with this beating-up motion the hooks 65 of the beating up comb are caused to lift or pull upward on the slackened pile thread so as uniformly to form all the piles entirely across the loom, this movement being accomplished by the pulling down of the link 71 on the levers 68, 70, which results in lifting the pivot 67 of the beating-up comb at the same time that the latter is swung forward by the downward movement of the link 76.

Figures 11, 12, 13, 14:
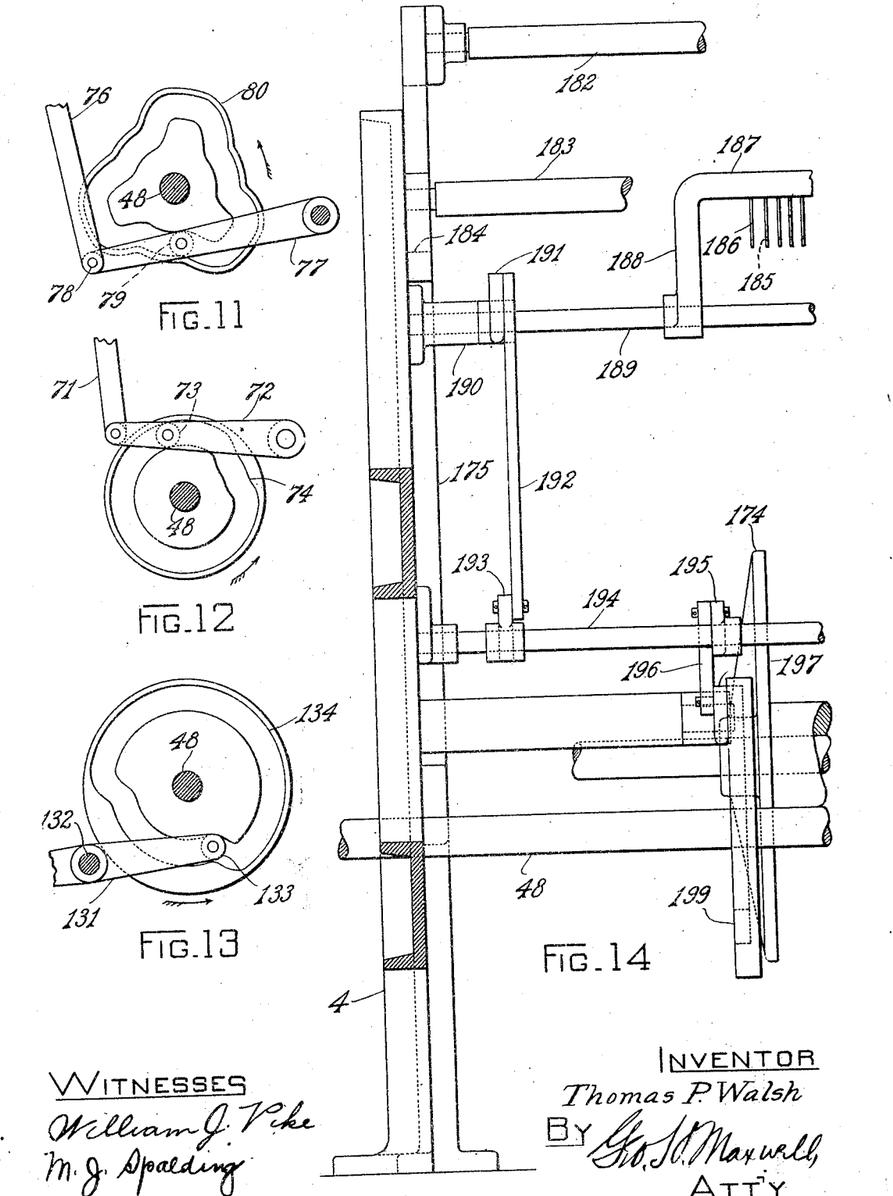
Fig. 11 shows the cam for beating up the filling.
Fig. 12 shows the cam for lifting the pile.
Fig. 13 shows the box motion cam.
Fig. 14 is an enlarged transverse vertical sectional detail of one side of the loom with various parts omitted to clearly show remaining parts.
Figure 15:
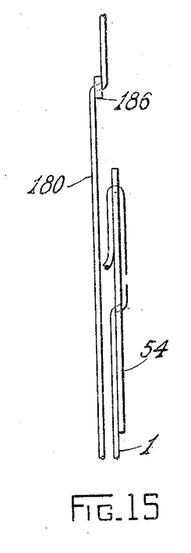
Figs. 15–22 are largely diagrammatic views showing the knots and knotting, Figs. 15 and 16 showing the threading of the warp threads for tying the Persian knot shown in further detail in Figs. 17, 18, 19, and 19ᵃ, Figs. 20 and 21 showing the Turkish knot and Fig. 22 the Indian knot.
Figure 16:
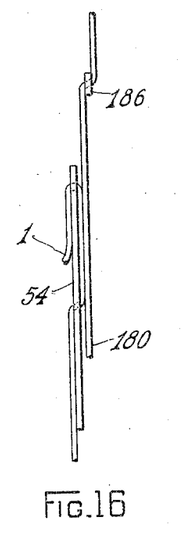
Figure 17:
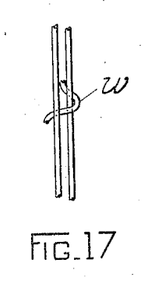
Figure 18:
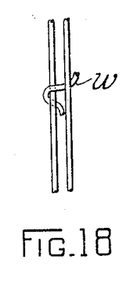
Figure 19:
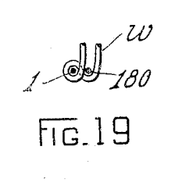
Figure 20:
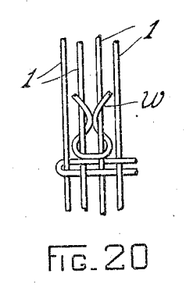
Figure 21:
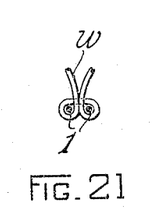
Figure 22:
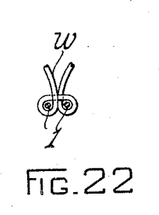
Figures 23, 24:
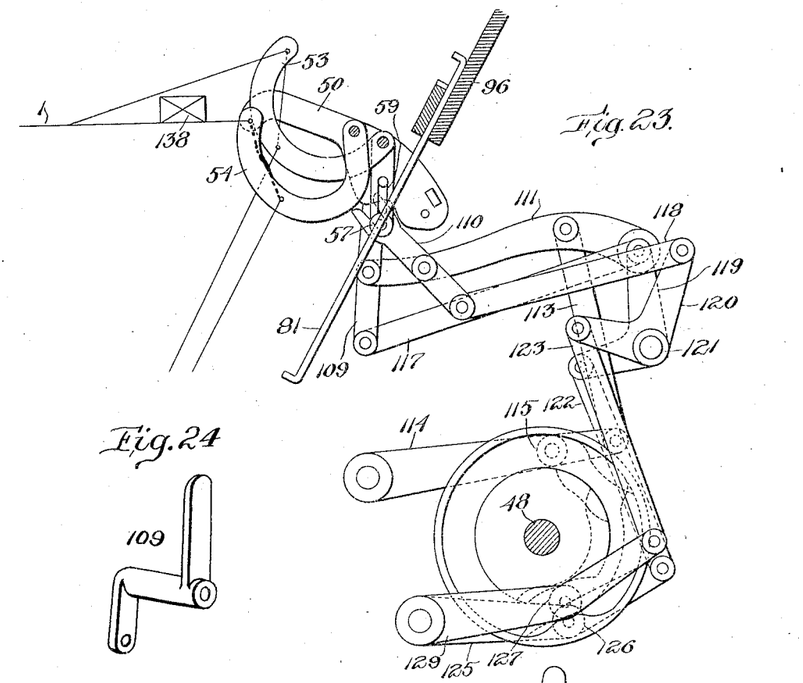
Fig. 23 shows in side elevation the shedding mechanism in shedding position.
Figs. 24 and 25 are detail views of levers 109 and 110.
Figures 25, 26:
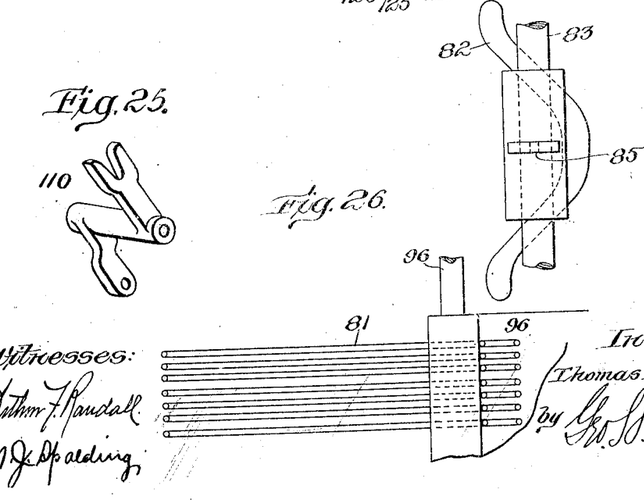
Fig. 26 is a top plan view of the slack-producing cam and a view of the adjacent needles showing the cam at the end of its throw.

I prefer to accomplish the beating-up and the pile-forming by one and the same mechanism, and herein claim said feature as such, but it will be understood that I am not restricted to accomplishing these two operations by one mechanism, as separate mechanisms may be employed for accomplishing the two movements independently. For ordinary purposes a relatively short pile is desired, the loom being herein shown as adjusted to that end, but a longer or shorter pile may be provided simply by adjusting the link 71 along a slot 173 provided in the arm 70. All the warp carriers are simultaneously revolved about 49 as a center by the engagement of the rack 103 with the pinion 104. After the pile thread has been beaten up and the piles lifted or formed, or while these operations are being accomplished, the warp carriers are swung back to the horizontal, or preferably below the horizontal, as herein shown, and are engaged by the shedding mechanism. For instance the lifter 109 is operated by its cam 126 so as to disengage the locking pin 61 of the arm 60, the lifter 109 being then swung forward while still engaging said pin 61, raising the warp carriers 54 which turns with its shaft 52 as a pivotal center so as to form a shed between their warp threads and the warp threads carried by the warp carriers 53. Just before the shed is formed, the box motion raises the shuttle 138 into position, and as the shed is formed the picking mechanism drives this shuttle and its binder thread across the loom through the shed forward of the knotter mechanism, and as it reaches the opposite side of the loom the shedding fork or lifter 109 swings back, restoring the warp carriers 54 to their lowered position, and thereupon instantly the shedding fork or lifter 110 swings forward, and accomplishes for the carriers 23 the same movements as were accomplished before by the lifter 109 for the other set of carriers 54, thereby rocking the rod 51 and simultaneously raising the opposite set of warp carriers 53, thus forming an opposite shed. Just as this is formed, the picking mechanism at the opposite side of the loom returns the shuttle 138 thereby inserting the second shot of binder thread. Then the shedding fork or lifter 110 moves back, causing its set of warp carriers 53 to drop so as to bring all the warp threads level again. The shedding forks or lifters 109, 110 are now permitted to drop out of engagement with the locking pins 58, 61, which thereupon lock the arms 57, 60 in immovable relation with the crank 50 so as to hold the warp carriers against movement, and, this having been accomplished, the warp carriers complete their downward return swing back to their normal position, Fig. 1. The shuttle box motion has meanwhile dropped, and all the parts are in position for taking care of the next shot of pile thread it being understood that one pick of pile thread alternates with each two picks of ordinary binder thread. At each shedding movement the corresponding easing rod 18 or 19 as the case may be is permitted to yield independently by its separate mounting 20, 21 and spring 34, 35 on the main lever 22. The lever 22 is yieldingly actuated by its cam 31 and the spring connections 32, 33 to maintain the warp threads under proper tension throughout their knot-forming movements. The above explained series of movements are repeated in regular weaving order with great rapidity and accuracy until the rug or fabric is finished. The mechanism of my loom as above described is capable of accomplishing a wide range of weaving effects. As thus far described, it will weave a rug or other fabric with Turkish knots (Figs. 20, 21) or so-called Indian knot (Fig. 22). To weave a Persian knot, which is shown in Fig. 19, it will be evident that it is necessary to coil the weft $w$ about one warp thread only of a pair of warp threads, said weft simply passing down under the other warp thread, and accordingly, in order to get this result with my mechanism, I introduce into the loom twice as many warp threads as I have previously referred to. This may be accomplished in a variety of ways, but for convenience I have shown a warp beam 174—Fig. 6—mounted at the rear end of the loom, a supplemental frame 175 being secured to the main frame for this purpose, and said warp beam being provided preferably with a usual let-off strap 176 and operating cam lever 177, spring 178, and bolt 179, all as shown in connection with the warp beam 2. On this warp beam 174 I provide a set of warp threads 180 passing over guide rolls 181, 182 and under a weight roll or compensating roll 183 vertically movable in slots 184 to the eyes 185 of a comb or series of warp-carrying needles 186 depending from a frame 187. These needles are arranged so as to bring a warp thread between each pair of warp carriers, or in other words the needles 186 direct a set of warp threads alternately with the warp threads 1 of the knotter mechanism. By this provision of the loom an extra set of warp threads is introduced into the fabric being woven (the fingers of beating-up comb 64 being correspondingly doubled). The needle-carrying frame 187 is mounted at the end of rocking arms 188, or rather the ends of the frame 187 are bent down, as best shown in Fig. 14, and fixed on a shaft 189 mounted in brackets 190.

Figure 19A:
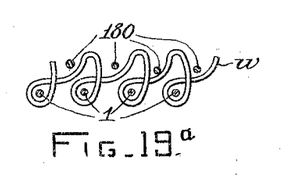

The shaft 189 is provided with crank levers 191 operated by links 192 connected to levers 193 on a shaft 194 provided with a crank 195 connected by a link 196 actuated by a cam lever 197 whose roll 198 travels in a path cam 199 on the main shaft 48, said path cam 199 being timed to maintain the warp threads 180 raised as shown in Fig. 6 while the filling pile is being shot across under the arch of the warp carriers or knotter mechanism, the slack drawn out therein, beaten up, and the pile formed, and said warp threads 180 so remain until the warp carriers move back to their shedding position. Thereupon the warp threads 180 are lowered to a level with the other warp threads. While this latter movement is taking place, the shedding forks are being raised. The shedding mechanism may be exactly the same as already described, in which case the warp threads 180 will have a shedding motion with one of the two sets of warp threads controlled by the warp carriers 53, 54, but, as this would result in an uneven distribution of the warp threads in groups of three and one, it is preferable to shed the warp threads 180 in one direction, while all the warp threads which are controlled by the knotting mechanism are moved in the other direction. This results in an even dividing of the warp threads inasmuch as the number of warp threads 180 is the same as the number of warp threads controlled by the knotting mechanism. Also, while, to accomplish this last mentioned shedding, it is essential merely that any simple mechanism shall be provided for moving the warp threads 180 into shedding position and then similarly moving the remaining warp threads for the next shedding movement, I prefer to accomplish the shedding movement by the same mechanism as already described, simply changing the timing so as to move the warp carriers 53 and 54 together instead of dissimultaneously as before, thereby forming the shed not between two portions of the warp threads 1, but between all the warp threads 1 in raised position and all the warp threads 180 in lowered position. To this end I provide a cam 200 having in its opposite faces identical path cams 201 so placed as to operate both sets of shedding mechanisms at the same time and thereby lift both sets of warp carriers simultaneously. The result is that when the filling or binder thread is shot through the shed and back again, it is bound by the warp threads 180 on one side and the remaining warp threads on the other side, and yet the warp threads 180 are held in raised position during the knotting operation, so that when the pile weft is shot through the knotting mechanism, it is knotted simply to those pile threads which happen to be controlled by the warp carriers 53, 54, and when engaged by the fingers of the beating-up comb 64 (doubled as stated) the pile weft is in the position shown in Fig. 19$^a$. When beaten up, the warp threads 180 are lowered into the plane of the threads 1, the result being the Persian knot, as shown in Fig. 19.

It will be understood that my invention is adaptable to all the usual wide ranges of color and weaving effects known in the weaving art, and that I have purposely described the same herein in connection with a simple form of loom and loom mechanism, in order that the main features of the invention may be more readily apprehended. Also, as already stated, certain features of my invention herein shown but not claimed are duly claimed in my before mentioned co-pending applications, which are intended to be generic to all features therein which are also contained herein.

Having described my invention, what I claim as new and desire to secure by Letters Patent of the United States is, 1. A loom, warp supporting means, means to shed the warp threads, means to introduce binder threads in the shed, and means to knot weft thread across the width of the loom between binder threads.

2. A loom, warp supporting means, means to shed the warp threads, means to introduce binder threads in the shed, means to knot weft thread across the width of the loom between binder threads, and means to beat up the binder threads and knotted weft thread.

3. In a loom, warp-supporting means, weft mechanism for forming weft pile loops in an intact weft thread, means for laying binder filling, and mechanism for knotting together said intact looped weft thread and the warp threads to hold said weft pile loops immovably in place.

4. In a loom, means for supporting a series of warp threads, mechanism for forming a series of weft pile loops in a single weft thread, and knotting mechanism for knotting together successively a plurality of looped weft threads and said warp threads, each weft thread being knotted against movement at the knot lengthwise of said weft thread, and means for laying binder filling.

5. In a loom, means for supporting a series of warp threads, mechanism for forming a series of weft pile loops in a single weft thread, knotting mechanism for knotting together successively a plurality of looped weft threads and said warp threads, and means for beating up the knotted piles.

6. In a loom, means for supporting ground warp threads in weaving position, and coöperating weaving mechanism, including binder mechanism and means for coiling individual ground warp threads around a weft thread, prior to the knotting of the latter around the former, in the process of knotting the weft thread around the warp threads.

7. In a loom, means for supporting warp threads in weaving position, and coöperating weaving mechanism, including means for delivering a weft thread transversely of said warp threads, and means for tying said weft thread while intact in a knot around said warp threads at a plurality of places throughout the length of said as yet uncut weft thread.

8. In a loom, means for supporting warp threads in weaving position, means for delivering a weft thread transversely of said warp threads, means for forming a series of piles in said single weft thread, coöperating means for tying said piles while the weft thread is intact in knots about said warp threads and binder weaving means.

9. In a loom, means for supporting a series of warp threads in weaving position, and coöperating weaving mechanism, including binder mechanism and means for coiling a weft thread around individual warp threads at three or more separated places throughout the length of the intact weft thread.

10. In a loom, means for supporting a series of warp threads in weaving position, and coöperating weaving mechanism, including binder mechanism and knot-forming means for securing immovably a weft thread to the successive warp threads throughout the series by knotting the weft thread while intact throughout said series around individual warp threads by a succession of knots throughout the length of the weft thread.

11. In a loom, means for supporting a series of warp threads in weaving position, and coöperating weaving mechanism, comprising binder mechanism and means for securing an intact weft thread to the successive warp threads by knotting the weft thread around individual warp threads by a succession of knots throughout the length of the weft thread, said securing means including mechanism for simultaneously forming said knots.

12. In a loom, means for supporting a series of warp threads in weaving position, and coöperating pile loop weaving mechanism, including means for delivering a weft thread transversely of said warp threads, slack-providing means for providing a plurality of deflections in the length of said weft thread, and mechanism for securing the intact weft thread around individual warp threads at each of said deflections and binder mechanism for holding the pile loops in upstanding position in the fabric.

13. In a loom, means for supporting a series of warp threads in weaving position, and coöperating pile loop weaving mechanism, including means for delivering a weft thread transversely of said warp threads, slack-providing means for said weft thread, and mechanism for knotting the intact weft thread to individual warp threads simultaneously at each pile-loop forming position, leaving the pile loops in woven pile position in the fabric and binder mechanism for maintaining said position.

14. In a loom, means for supporting a series of warp threads in weaving position, and coöperating pile loop weaving mechanism, including means for delivering a weft thread transversely of said warp threads, slack-providing means for providing progressively a plurality of loops in the length of said weft thread, and mechanism for knotting the intact weft thread to individual warp threads at each pile-loop forming position, while leaving the loops in woven pile position in the fabric and binder mechanism for maintaining said position.

15. In a loom, warp carriers, operating mechanism coöperating therewith to arch the warp threads in alined loops, a series of fingers movable into position to form a raceway at said loops, a weft-carrying device and operating means for moving the same along said raceway, means for moving said fingers into engagement with the weft to form a series of slack places in the form of lateral deflections throughout the length of the latter, and coöperating binder mechanism to bind said weft and warp threads into a woven fabric.

16. In a loom, warp carriers, operating mechanism coöperating therewith to arch the warp threads in alined loops, a weft-carrying device and operating means for moving the weft thread through said alined loops, a series of fingers, means for engaging said fingers with the weft to form a series of slack places in the form of lateral deflections therein, mechanism to beat up the weft including the deflections to pile position, and binder mechanism to bind said beaten-up weft and the warp threads into a woven fabric.

17. In a loom, warp carriers, operating mechanism coöperating therewith to arch the warp threads in alined loops, a weft-carrying device and operating means for moving the weft thread through said alined loops, a series of fingers, means for progressively engaging said fingers with the weft to form a series of lateral bends or deflections therein, mechanism to beat up said weft and its lateral bends to pile position, and binder mechanism to bind said beaten-up weft and the warp threads into a woven fabric.

18. In a loom, warp carriers, operating mechanism coöperating therewith to arch the warp threads in alined loops, a weft-carrying device and operating means for moving the weft thread through said alined loops, a series of fingers, means for progressively engaging said fingers with the weft to form a series of lateral bends or deflections therein, said progressive engagement following the movement of the weft moving means alternately from the opposite sides of the loom, mechanism to beat up said weft and its said deflections to the fell, and binder mechanism to bind the beaten-up weft and the warp threads into a woven fabric.

19. In a loom, means to support two approximately parallel ground threads in predetermined weaving position, a main source of supply of a third thread which is to be knotted, and coöperating weaving mechanism, including means to knot said third thread, while intact as an unsevered part of said supply, with a two-coil knot about said two threads, one coil about each thread, and binding-thread mechanism for binding the knotted weft thread and warp threads into a woven fabric.

20. In a loom, means to support two ground warp threads, and coöperating weaving mechanism, including means for delivering a weft thread transversely of said warp threads, knotting means coöperating with said weft-thread delivering means to tie said weft thread, while intact from its source of supply, onto said ground warp threads with a coil of said weft thread around at least one of said ground warp threads, and binding-thread mechanism for binding the knotted weft thread and warp threads into a woven fabric.

21. A loom, warp supporting means, means to shed the warp threads, means to introduce binder threads in the shed, means to knot weft thread across the width of the loom between binder threads, and means to form pile loops in the weft thread between the knots thereof across the width of the loom.

22. A loom, warp supporting means, means to shed the warp threads, means to introduce binder threads in the shed, means to knot weft thread across the width of the loom between binder threads, and means to form pile loops in the weft thread between the knots thereof across the width of the loom, including means to vary the length of the pile loops.

23. In a loom, warp supporting means, means to shed the warp threads, means to introduce binder threads in the shed, means to knot weft thread across the width of the loom between binder threads, slack-forming means to produce slack at intervals throughout the length of said weft thread, and means to form pile loops in the slackened weft thread between the knots thereof.

24. In a loom, weaving mechanism, including shedding mechanism, coöperating means to introduce binder threads, means to introduce pile thread, and beat-up mechanism, including means to actuate said beat-up mechanism to raise the pile.

25. In a loom, weaving mechanism, including shedding mechanism, coöperating means to introduce binder threads, means to introduce pile thread, and beat-up mechanism and its operating mechanism, including means providing a combined forward beating movement and upward pile-forming movement.

26. In a loom, weaving mechanism, including shedding mechanism, coöperating means to introduce binder threads, means to introduce pile thread, a beater comb provided with hook shaped portions in position to engage the pile thread, and operating mechanism imparting to said comb a forward beating movement and upward pile-forming movement.

27. In a loom, weaving mechanism, including shedding mechanism, coöperating means to introduce binder threads, means to introduce pile thread, a beater comb provided with hook shaped portions in position to engage the pile thread, and means moving the hook shaped portions of the comb into engagement with said pile thread and causing the same to pull the pile thread into pile loops throughout the width of the loom.

28. In a loom, warp supporting means, weaving mechanism, including shedding mechanism, and alternately operating mechanisms to weave in binder weft threads transversely of the warp threads and to knot in weft pile loops, said shedding mechanism coöperating progressively with said alternately operating mechanisms to weave a unitary knotted pile of fabric.

29. In a loom, warp supporting means, weaving mechanism, including shedding mechanism, alternately operating mechanisms to weave in a plurality of picks of binder weft threads transversely of the warp threads and to interknot with the warp threads weft pile loops, and mechanism to beat up the transverse threads as the weaving proceeds, said shedding mechanism coöperating progressively with said other mechanisms to weave a unitary knotted pile fabric.

30. In a loom, warp supporting means, shedding mechanism, mechanisms for introducing binder weft threads alternately with certain of the shedding movements, and for introducing other weft thread after other shedding movements, and knotting mechanism for knotting together said last mentioned other weft thread and the warp threads.

31. In a loom, warp supporting means, shedding mechanism, mechanisms for introducing binder weft threads alternately with certain of the shedding movements, and for introducing other weft thread after other shedding movements, and knotting mechanism for knotting said last mentioned other weft thread around the warp threads at a plurality of places throughout the length of said weft thread.

32. In a loom, warp supporting means, shedding mechanism, mechanisms for introducing binder weft threads alternately with certain of the shedding movements, and for introducing other weft thread after other shedding movements, knotting mechanism for knotting said last mentioned other weft thread around the warp threads at a plurality of places throughout the length of said weft thread, and coöperating means for forming a series of piles in the single weft thread thus knotted.

33. In a loom, warp supporting means, shedding mechanism, mechanisms for introducing binder weft threads alternately with certain of the shedding movements, and for introducing other weft thread after other shedding movements, and knotting mechanism for simultaneously knotting said last mentioned other weft thread around the warp threads at a plurality of places throughout the length of said weft thread.

34. In a loom, warp supporting means, shedding mechanism, mechanisms for introducing binder weft threads alternately with certain of the shedding movements, and for introducing other weft thread after other shedding movements, and knotting mechanism for simultaneously knotting said last mentioned other weft thread around a plurality of the warp threads by a plurality of separated knots, each around a separate warp thread.

35. In a loom, warp supporting means, shedding mechanism for the warp threads, means for introducing binder weft threads, means for delivering a weft thread transversely of said warp threads, slack-forming means for providing a plurality of slack places for pile loops in the length of said weft thread, and knotting mechanism for tying the weft threads to individual warp threads at each of said slack places.

36. In a loom, warp supporting means, shedding mechanism for the warp threads, means for introducing binder weft threads, means for delivering a weft thread transversely of said warp threads, slack-forming means for providing a plurality of slack places for pile loops in the length of said weft thread, knotting mechanism for tying the weft threads to individual warp threads at each of said slack places, and means to lift said weft thread at its said slackened places in pile formation out of the way of the weaving of the body of the fabric.

37. In a loom, warp supporting means, shedding mechanism for the warp threads, means for introducing binder weft threads, means for delivering a weft thread transversely of said warp threads, slack-forming means for progressively providing a plurality of slack places for pile loops in the length of said weft thread while in an uncut or intact condition, and knotting mechanism for tying the intact weft thread to individual warp threads at each of said slack places.

38. In a loom, shedding mechanism, shuttle mechanism, knotting mechanism normally in line with the shuttle mechanism, the latter including means for driving a pick of weft thread in position to be knotted into the fabric by said knotting mechanism, operating means for the knotting mechanism moving the knotting mechanism out of line with the shuttle mechanism, said shedding mechanism operating to shed the warp threads when the knotting mechanism is in said position out of line with the shuttle mechanism, and the latter including means for driving binder thread through the shed outside of the knotting mechanism.

39. In a loom, shedding mechanism, means to drive binder threads through the shed of the warp threads, knotting mechanism for forming longitudinal loops in certain of the warp threads and holding them open in line with each other in the form of a transverse arch across the loom, means for driving a weft thread through the arch of warp loops, coöperating means for transferring the longitudinal warp loop formation into transverse weft loops or coils of said weft thread about the warp threads, and means for beating up said binder thread and coiled weft thread to form a knotted woven fabric.

40. In a loom, shedding mechanism, means to drive binder threads through the shed of the warp threads, knotting mechanism for forming longitudinal loops in certain of the warp threads and holding them open in line with each other in the form of a transverse arch across the loom, means for driving a weft thread through the arch of warp loops, coöperating means for transferring the longitudinal warp loop formation into transverse weft loops or coils of said weft thread about the warp threads, means for pulling said weft thread out laterally at a plurality of separated places throughout its length for forming piles therein, and means for beating up said binder thread and coiled weft thread to form a knotted woven pile fabric.

41. In a loom, knotting mechanism, including warp carriers arranged in line with each other transversely across the loom normally in the weaving plane of the warp threads, means for delivering a single pile thread transversely of a plurality of said warp carriers, shedding mechanism for shedding certain of the warp threads from the remaining warp threads, and shuttle mechanism for driving picks of weft thread as the warp threads are shed.

42. In a loom, knotting mechanism, including two sets of warp carriers independently movable, casing mechanism containing two easing rods yielding independently, one rod supporting the warp threads for one set of said warp carriers and the other rod supporting the warp threads for the other set of said warp carriers, and shedding mechanism operating alternately to engage and move one set of said warp carriers from the other set for producing a shed in the warp threads.

43. In a loom, shedding mechanism, knotting mechanism for tying a weft thread in knots about a plurality of the warp threads at a corresponding plurality of places throughout the length of said weft thread, and means for separating the warp threads into pairs, said shedding mechanism including means permitting one warp thread of each pair to be depressed when the other warp thread of said pair is in a raised position.

44. In a loom, knotting mechanism, including means for manipulating the individual warp threads, and easing mechanism for permitting said warp threads to yield under said manipulation, including a plurality of give-aways, spring means for permitting said give-aways to yield, and limiting stop means for maintaining a desired tension on the warps.

45. In a loom knotting mechanism, including two sets of warp carriers, locking means normally locking said warp carriers to move together, and operating means to move said warp carriers.

46. In a loom, knotting mechanism, including two sets of warp carriers, locking means normally locking said warp carriers to move together, operating means to move said warp carriers, and shedding mechanism, including means to unlock said warp carriers and move said two sets dissimultaneously.

47. In a loom, knotting mechanism, including two sets of warp carriers, opposite pivoted cranks pivotally supporting said warp carriers at the free ends of said cranks, and means to swing said cranks and their warp carriers about the crank pivots as a center.

48. In a loom, knotting mechanism, including two sets of warp carriers, opposite pivoted cranks pivotally supporting said warp carriers at the free ends of said cranks, means to swing said cranks and their warp carriers about the crank pivots as a center, and shedding mechanism including means to swing said two sets of warp carriers dissimultaneously on their pivots.

49. In a loom, weaving mechanism, including a pivoted beating up comb, means to swing said comb forward about its pivot for its beating up motion, and means to raise said pivot as the comb is swinging forward, said comb having engaging hooks for raising the pile as the comb is raised in its forward swinging movement.

50. In a loom, weaving mechanism, including a pivoted beating up comb, means to swing said comb forward about its pivot for its beating up motion, means to raise said pivot as the comb is swinging forward, said comb having engaging hooks for raising the pile as the comb is raised in its forward swinging movement, and adjusting means for varying the extent of said pile-forming movement.

51. In a loom, box-motion mechanism, including a plurality of shuttles, shedding mechanism, pile-forming mechanism, including knotting mechanism, driving mechanism to drive a shuttle of binder weft across the warp threads when the shed is open and the knotting mechanism is inoperative, and to drive a shuttle of pile thread across the warp when the shed is open and the knotting mechanism in operative position to receive the pile thread, and operating means for the knotting mechanism to actuate the latter to knot the pile thread thus driven at a plurality of places throughout its length to a corresponding plurality of the warp threads.

52. In a loom, knotting mechanism, for manipulating a plurality of the warp threads of the fabric being woven, means for introducing into the fabric a plurality of warp threads independently of said knotting mechanism, shedding mechanism, and means for introducing pile thread to said knotting mechanism to be knotted by the latter at a plurality of separate places about a plurality of the warp threads of the fabric, and co-operating shedding mechanism aiding in binding the pile thread into the fabric.

53. In a loom, knotting mechanism, for manipulating a plurality of the warp threads of the fabric being woven, means for introducing into the fabric a plurality of warp threads independently of said knotting mechanism, and means for introducing pile thread to said knotting mechanism to be knotted by the latter at a plurality of separate places about a plurality of the warp threads of the fabric, and shedding mechanism actuating a portion of the warp threads, including the said independent warp threads, to form a shed with relation to the remainder of the warp threads.

54. In a loom, warp supporting means, means for weaving the body of the fabric, means for supporting a pile forming thread transversely of the warp threads, means for bending said pile forming thread transversely between the warp threads at intervals throughout its length and thereby forming loops in said pile forming thread, and means for engaging the laterally bent portions of the pile forming thread and raising said portions into pile position with reference to the body of the fabric.

55. In a loom, warp supporting means, means for weaving the body of the fabric, means for providing a pile forming thread transversely of the warp threads, a series of devices for bending said pile forming thread between the warp threads at intervals across the loom, operating means for causing said bending devices to move step by step, one after the other, to draw loops of said pile forming thread laterally between adjacent warp threads at predetermined intervals transversely across the loom, and coöperating mechanism for coiling said pile forming thread about the warp threads in oriental knots at each point where the pile forming thread is bent to embrace said warp threads.

In testimony whereof, I have signed my name to this specification, in the presence of two subscribing witnesses.

THOMAS P. WALSH.

Witnesses:
M. J. SPALDING,
WILLIAM J. PIKE.